(12) United States Patent
Gauger (10) Patent No.: US 9,669,691 B2
(45) Date of Patent: Jun. 6, 2017

(54) COVERING DEVICE OF A LUGGAGE COMPARTMENT OF A MOTOR VEHICLE

(71) Applicant: Volkswagen Aktiengesellschaft, Wolfsburg (DE)

(72) Inventor: Stefan Gauger, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 15/197,825

(22) Filed: Jun. 30, 2016

(65) Prior Publication Data

US 2016/0303958 A1 Oct. 20, 2016

Related U.S. Application Data

(63) Continuation of application No. PCT/EP2014/073129, filed on Oct. 28, 2014.

(30) Foreign Application Priority Data

Dec. 30, 2013 (DE) .......................... 10 2013 022 154

(51) Int. Cl.
*B60J 7/20* (2006.01)
*B60R 5/04* (2006.01)

(52) U.S. Cl.
CPC .............. *B60J 7/202* (2013.01); *B60R 5/047* (2013.01)

(58) Field of Classification Search
CPC .................................. B60J 7/202; B60R 5/047
See application file for complete search history.

(56) References Cited

U.S. PATENT DOCUMENTS

| 529,517 | A | * | 11/1894 | Burrowes | ................. E06B 9/54 |
| | | | | | 160/289 |
| 6,312,036 | B1 | | 11/2001 | Ehrenberger et al. | |
| 6,592,165 | B2 | | 7/2003 | Ament et al. | |
| 8,162,370 | B2 | * | 4/2012 | Hintennach | ............. B60R 5/047 |
| | | | | | 296/37.16 |
| 8,167,349 | B1 | | 5/2012 | Cha et al. | |
| 2007/0125506 | A1 | * | 6/2007 | Eiselt | ..................... B60R 5/047 |
| | | | | | 160/370.22 |

(Continued)

FOREIGN PATENT DOCUMENTS

| DE | 198 56 741 A1 | 6/2000 |
| DE | 10161647 A1 * | 6/2003 |

(Continued)

*Primary Examiner* — Blair M Johnson
(74) *Attorney, Agent, or Firm* — Muncy, Geissler, Olds & Lowe, P.C.

(57) ABSTRACT

A covering device for a storage area of a motor vehicle having a storage area cover which is at least partly flexible and can be drawn from a storage device against a spring force into a use position. The covering device also has a guiding device that has two guiding rails, which run substantially parallel to each other and in which the guiding elements can be guided, and at least one locking device for releasably locking the guiding elements in the guiding rails. The locking device has a latching protrusion in each guiding rail, a latching lug of the respective guiding element being latchable to the latching protrusion against the spring force, and each latching lug can be lifted over the respective latching protrusion in order to release the lock by tilting the bearing rod in a first direction using an actuating element.

10 Claims, 5 Drawing Sheets

(56) References Cited

U.S. PATENT DOCUMENTS

2008/0179022 A1* 7/2008 Hayashi .................. B60R 5/047
  160/327
2016/0303958 A1* 10/2016 Gauger ................... B60J 7/202

FOREIGN PATENT DOCUMENTS

| | | | |
|---|---|---|---|
| DE | 10256348 A1 * | 9/2004 |
| DE | 60 2005 2002 429 T2 | 5/2008 |
| DE | 102007019858 A1 * | 10/2008 |
| DE | 102 56 348 B4 | 6/2009 |
| DE | 10 2008 061 106 A1 | 6/2010 |
| DE | 10 2006 008 873 B4 | 9/2010 |
| EP | 1 225 094 A2 | 7/2002 |
| EP | 1 923 269 B1 | 7/2010 |
| FR | 2 990 394 A1 | 11/2013 |
| FR | 2 999 494 A1 | 6/2014 |
| FR | 3022870 B1 * | 7/2016 |
| WO | WO 2014127820 * | 8/2014 |

* cited by examiner

COVERING DEVICE OF A LUGGAGE COMPARTMENT OF A MOTOR VEHICLE

This nonprovisional application is a continuation of International Application No. PCT/EP2014/073129, which was filed on Oct. 28, 2014, and which claims priority to German Patent Application No. 10 2013 022 154.4, which was filed in Germany on Dec. 30, 2013, and which are both herein incorporated by reference.

BACKGROUND OF THE INVENTION

Field of the Invention

The invention relates to a covering device for a storage area of a motor vehicle, comprising a storage area cover which is flexible at least in sections and which may be pulled out of a storage device against a spring force into a use position, the storage area cover having a bearing rod on its free end, which extends over the width of the storage area cover and has a guide element on each of its free ends; comprising a guide device, which has two guide rails running in parallel to each other, in which the guide elements are guidable; and comprising at least one locking device for releasably locking the guide elements in the guide rails, the locking device having a latching protrusion in each guide rail, to which the particular guide element is latchable against the spring force with the aid of a latching lug, and the particular latching lug being able to be lifted over the particular latching protrusion for the purpose of releasing the lock by tilting the bearing rod with the aid of an actuating element.

Description of the Background Art

Covering devices are known from the conventional art. To protect the contents of a storage area of a motor vehicle from external view or also from sunlight, it is known to assign the storage area of a motor vehicle a covering device, with the aid of which a user may cover the storage area as needed. A storage area cover is frequently provided in the form of a flexible roll-up tarp, which may be pulled out of a storage device, which is then designed as a winding device, against a spring force of the storage device into a use position, in which the storage area is partially or completely covered. To be able to lock the storage area cover in the use position, a locking device is sensibly provided, which interacts with the free end of the storage area cover, the storage area cover generally having a rigid end element for this purpose, such as a bearing rod which extends over the entire width, a guide element being provided on each free lateral end thereof, which is displaceably guided in a guide rail and is lockable in at least one position in the guide rail.

For example, EP 1 923 269 B1 discloses a covering device of the generic type, in which the guide elements may be introduced into recesses in the guide rail by tilting an end-side bearing rod. The lock may be released again by tilting back the bearing rod. Similar covering devices are also known from DE 10 2008 061 106 A1, DE 10 2006 008 873 B4 and DE 102 56 348 B4.

However, the known covering devices have the disadvantage that the lock is always able to be released only by tilting the bearing rod in only one direction. However, if the storage area is filled so full that it is not possible to tilt the bearing rod in this direction, which is often also connected to a rigid end piece (end board), as shown, for example in DE 102 56 348 B4, because, for example, the end board bumps against the cargo, it is not possible to open the storage area cover without first unloading the cargo.

SUMMARY OF THE INVENTION

It is therefore an object of the invention to provide a covering device, which allows the lock to be released in each case, even if a tilting of the bearing rod in the first direction is not possible.

The object of the invention is achieved in an embodiment by a covering device, whereby this has the advantage that the lock is also released by tilting the bearing rod in the opposite direction, and the storage area cover may be returned to its original position. According to an embodiment of the invention, this is achieved by the fact that the guide elements, which are tiltably disposed relative to the bearing rod, are assigned at least one lever device, preferably one lever device each, which lifts or begins to lift the latching lugs over the latching protrusions when the bearing rod is tilted in the second direction. It is also provided, according to an embodiment of the invention, that the particular guide element is not rigidly connected to the bearing rod but is able to tilt or rotate relative thereto. As a result, the tilting motion of the particular guide element is independent of the bearing rod, at least over a predefinable tilting range. Due to the particular lever device, which advantageously interacts with the bearing rod, the particular guide element is actuated against the tilting direction of the bearing rod during a tilting of the bearing rod in the second direction, such that the particular latching lug is released from the latching protrusion or lifted over the latching protrusion, whereby the lock is released. Due to the simple structure with the lever device, the object of the invention may be achieved easily and also cost-effectively. If the guide elements are operatively connected to each other, one lever device is sufficient for actuating both guide elements. Otherwise, it is preferred to assign a corresponding lever device to each guide element.

According to an embodiment of the invention, it is provided that the lever device forms a scissors-type lever with the particular guide element, for which purpose, the particular guide element is connected to a particular lever element in a scissors-like manner by a pivot joint. The lever element and the guide element are this disposed next to each other, at least in areas, and are connected to each other at this point in the manner of a pivot joint. A particularly simple lever mechanism is offered hereby for actuating the guide element. The scissor design achieves the fact that, when the lever element moves in one direction, the guide element is moved in the other direction. The pivot joint can be formed by a bearing bolt, which at least essentially penetrates the guide element for the rotatable supporting thereof, and which is disposed, in particular, on the lever element.

It is furthermore preferably provided that the pivot joint can form a rotation axis, around which the guide element and the lever element are rotatable relative to each other, at least in areas, the rotation axis extending in parallel to the longitudinal extension or the tilting axis of the bearing rod. This ensures an actuation of the covering device which is pleasant for and easily understood by the user. This also permits a particularly space-saving design of the invention. The guide element is advantageously tilted around the same axis around which the bearing rod is also tilted.

The particular lever element can have a sliding tip situated at a distance from the rotation axis for sliding contact with the guide rail and is fixedly connected to the bearing rod. In contrast to the guide element, the lever element is thus fixedly connected to the bearing rod, so that the lever element has a tilting position which always corresponds to the bearing rod. The sliding tip is used for contact on the guide rail, so that the lever element and thus also the bearing rod is supportable on the sliding top on the guide rail. As a result, the rotation axis is lifted from the guide rail when the bearing rod tilts into the first direction for the purpose of lifting the latching lug over the latching protrusion. If the guide element has a correspondingly high weight on the side of the rotation axis opposite the sliding tip, so that the lifting element and the guide element are moved in a scissors-like manner relative to each other when the rotation axis is lifted, whereby the latching lug is easily lifted over the latching protrusion.

According to an exemplary embodiment of the invention, it is provided that the guide rails have a U-shaped profile and are oriented to face each other, a lower leg of each guide rail forming a sliding rail, on which the lever element and the guide element are slidingly supported. The bearing rod, together with the guide elements, is safely guided hereby along the storage area both laterally and in height. The guide rails can extend over the entire storage area, so that the storage area cover is always guided in the guide rails. However, it is also conceivable to provide the guide rail only in the area of the use position or the locking device.

It is furthermore preferably provided that the particular latching protrusion of the locking device can be formed on the sliding rail in such a narrow design that the lever element is able to slide past the latching protrusion on the sliding rail together with the sliding tip. This results in the advantage that the latching projection extends only in an area which is traversed by the guide element when the storage area cover travels along the guide rail. As a result, the lever element may be guided past the latching protrusion regardless of its tilting position, provided that the guide element, together with its latching lug, is lifted over the latching protrusion accordingly.

According to an embodiment of the invention, it is provided that the guide rails can each have an actuating protrusion on the leg opposite the protrusion, which, in the locked position of the guide element, is assigned to the rotation axis at a distance from an actuating end of the guide element, for the purpose of holding the rotation axis on the sliding rail when the bearing rod is tilted in the second direction. The rotation axis is also lifted by the tilting of the bearing rod in the second direction, as mentioned above. The actuating protrusion ensues that the guide element is lifted on the end opposite the latching lug less high than the rotation axis, so that, due to the lever effect, the latching lug is lifted past the latching protrusion when the lever element is supported by its sliding tip on the sliding rail and the rotation axis is lifted. This easily ensures the safe release of the latching lug from the latching protrusion on the end opposite the latching lug when the bearing rod is tilted in the second direction, regardless of the weight of the guide element.

The particular lever element can have a rotary entrainment for the particular guide element, for the purpose of releasing the latching lugs from the latching protrusions when the bearing rod is tilted in the first direction. Since the particular lever element is rigidly connected to the bearing rod, the latching lug ensures that, when the lever element is tilted in the first direction by the bearing rod, the latching lugs are also lifted over the latching protrusion. Viewed in the first tilting direction, the rotatability of the guide element or the lever element is correspondingly limited. This easily ensures that the particular latching lug is safely released from the latching protrusion when the bearing rod tilts in the first direction.

According to an embodiment of the invention, it is provided that the bearing rod is assigned an at least essentially rigid end board as the actuating element, which is fixedly connected to the bearing rod for the purpose of tilting the latter. A user may thus easily release the lock by lifting or pressing down on the end board. The end board particularly preferably also has a gripping device, which makes it easier to actuate the end board and tilt the bearing rod.

Furthermore, the oppositely situated legs of the particular guide rail can run essentially in parallel to each other and have a greater distance from each other only in the area of the locking device. The greater distance ensures the flawless functioning of the scissors-type lever even if the latching protrusion has a comparatively large design. On the whole, this ensures that a safe locking action is provided by a correspondingly large latching protrusion when a safe release of the lock by tilting the bearing rod in both directions is reliably ensured.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
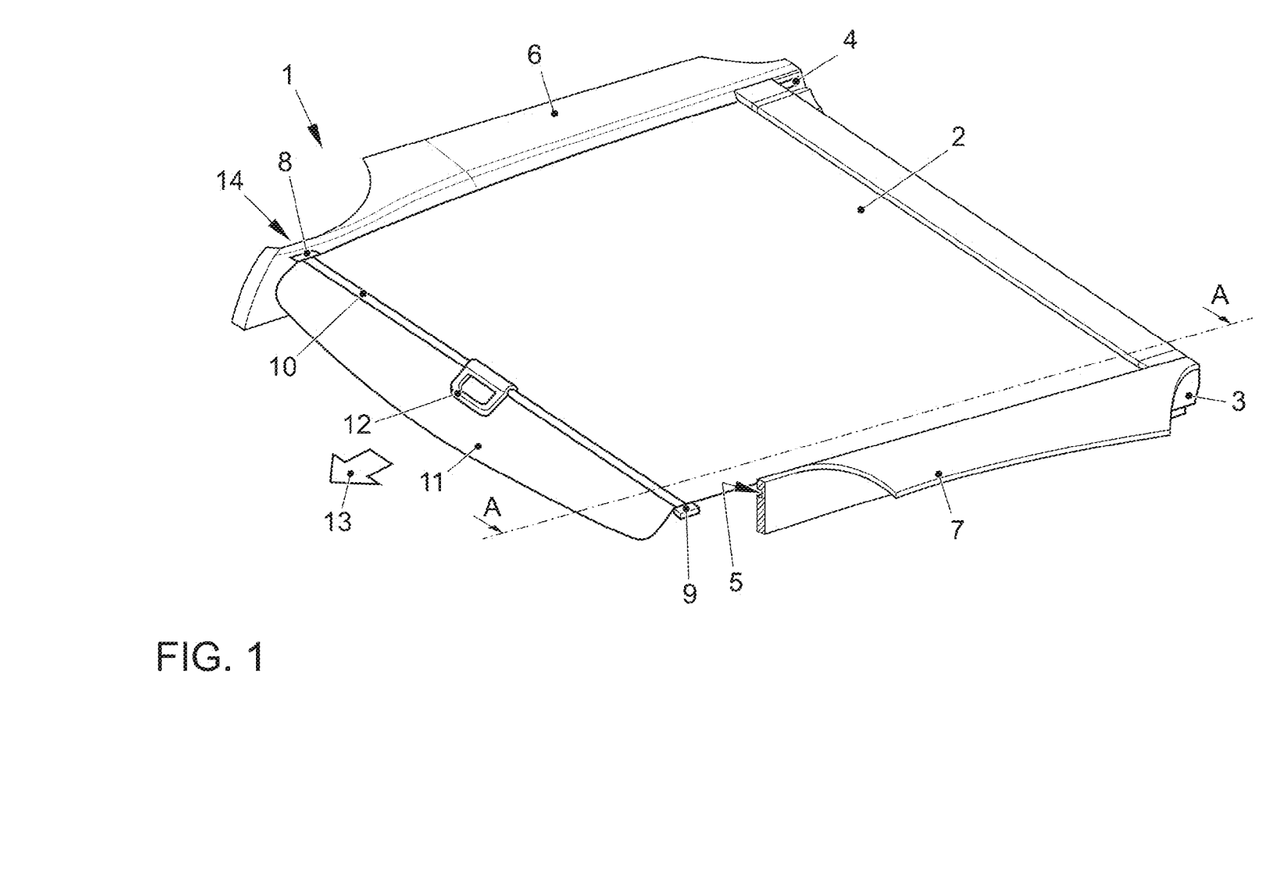
FIG. 1 shows a perspective representation of a covering device for a storage area.

FIG. 1 shows a perspective representation of a covering device 1 for a storage area of a motor vehicle. Covering device 1 essentially has a flexible storage area cover 2, a storage device 3, which is designed as a winding device for winding up storage area cover 2, as well as two guide rails 4, 5, which run in parallel to each other and in which storage area cover 2 is guided. The two guide rails 4, 5 are inserted into side wall elements 6, 7 and have a U-shaped design, viewed in cross section. Guide rails 4, 5 are oriented to face each other, so that guide elements 8, 9 assigned to storage area cover 2 are each displaceably mounted on one lower leg of the particular guide rail. Guide elements 8, 9 are assigned to a bearing rod 10, which extends over the entire width of storage area cover 2 on its free end. Bearing rod 10 is connected to a rigid end board 11, which forms an actuating element, an engageable gripping device 12 being optionally formed on end board 11 and being rotatably fixedly connected to bearing rod 10. With regard to the rest of storage area cover 2, bearing rod 10 is tiltable around its longitudinal axis with the aid of end board 11 or gripping device 12.

In the situation illustrated in FIG. 1, storage area cover 2 is extended, according to arrow 13, from storage device 3 into a use position, in which bearing rod 10 is locked. The covering device has a locking device 14 for this purpose, which is explained in greater detail below.

Figure 2:
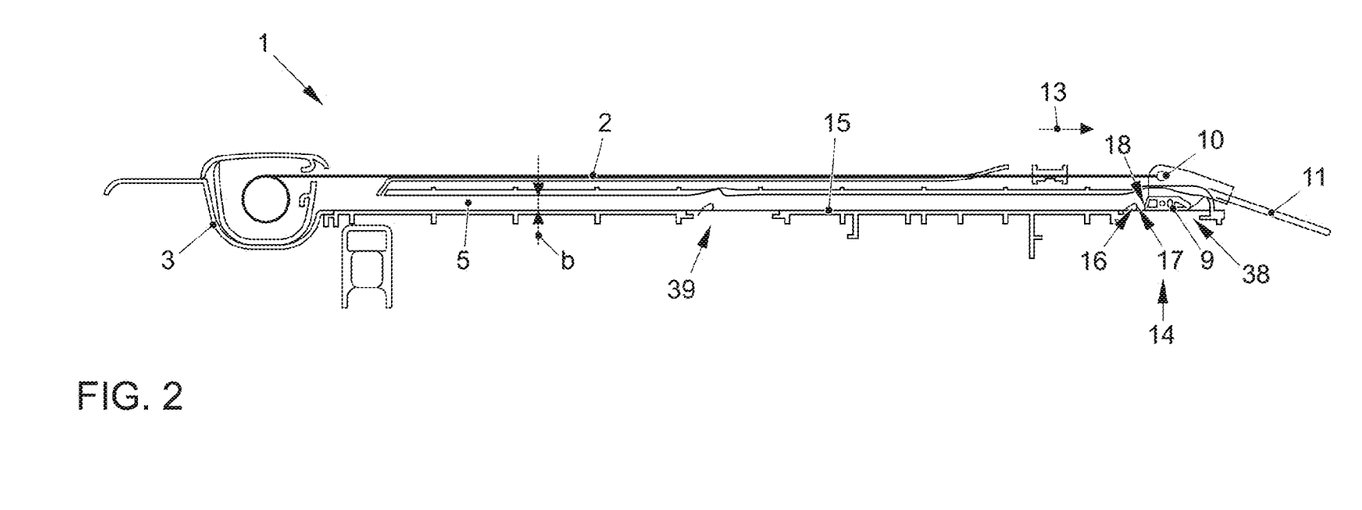
FIG. 2 shows a longitudinal sectional representation of the covering device.

For this purpose, FIG. 2 shows a longitudinal sectional representation of covering device 1 according to line A-A from FIG. 1. Guide rails 4, 5 consistently have a constant width b. Width b is increased only in the area of locking device 14. On the particular leg on which particular guide element 8, 9 is situated, which insofar forms a sliding rail 15, locking device 14 has a latching protrusion 16, to which guide element 8, 9 is latchable against a spring force of storage device 3, which pulls storage area cover 2 into storage device 3. Storage area cover 2 is held in the use position by the latching action. As illustrated in FIG. 2, It is preferably provided that at least one second locking device 39 s provided, which has an identical design to locking device 14 and which is disposed, for example, halfway between storage device 3 and locking device 14. Storage area cover 2 is able to be latched thereby in a second use position.

Latching protrusions 16 have a run-in chamfer in the pull-out direction according to arrow 13, by means of which particular guide element 8, 9 is automatically lifted over particular latching protrusion 16 during pull-out. On the opposite side, latching protrusion 16 has an indentation 17, which interacts with a latching lug 18 of particular guide element 8, 9 when latching lug 18 is pulled into indentation 17 by the spring force of storage device 3. In the latched position, latching protrusion 16 thus grips latching lug 18 in areas. Alternatively, it may be provided that the back of latching protrusion 16 has a straight run-in chamfer, which is oriented, in particular, perpendicularly to sliding rail 15.

Figure 3:
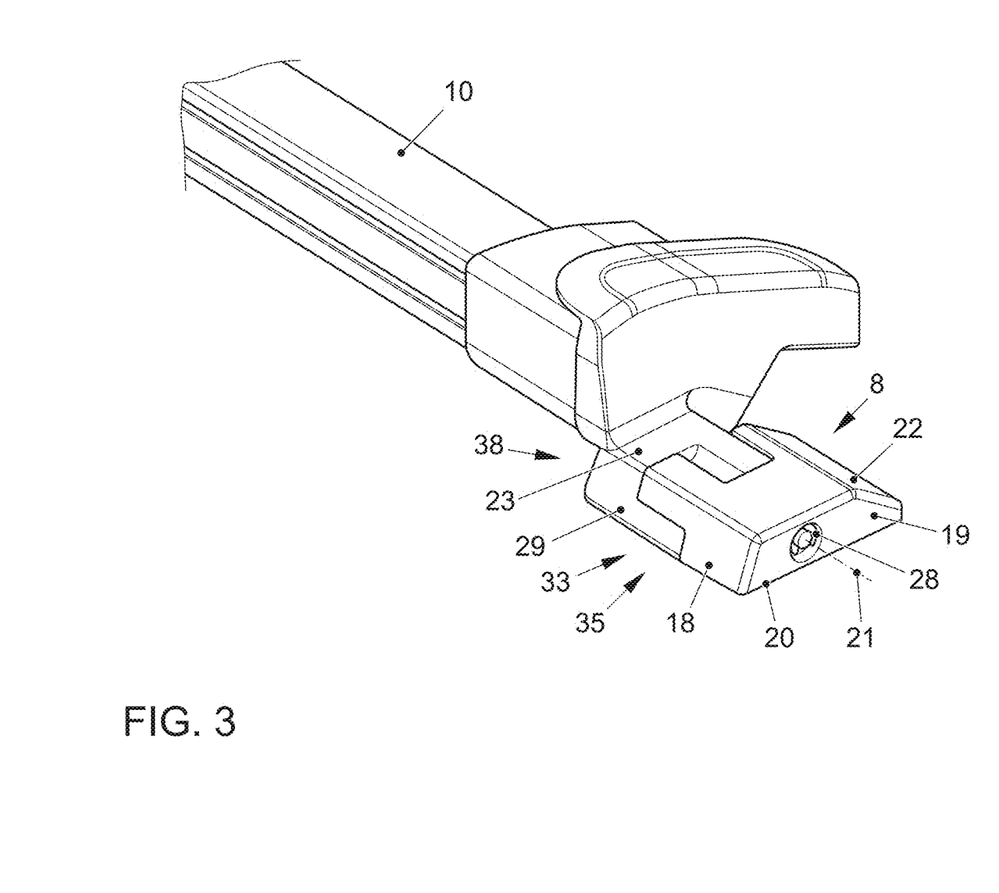
FIG. 3 shows a detailed view of the covering device.

FIG. 3 shows a lateral end of bearing rod 10, including guide element 8 disposed thereon. Guide elements 8, 9 are designed to be mirror-symmetrical with regard to the longitudinal extension of storage area cover 2, so that the description relating to guide element 8 applies equally to the specific embodiment of guide element 9. Guide element 8 is designed as a sliding block 19, which has a smooth underside 20 for sliding contact with sliding rail 15. Guide element 8 is mounted relative to bearing rod 10 in such a way that it rotates around a rotation axis 21, which is oriented in parallel to the longitudinal extension of bearing rod 10, guide element 8 being designed in such a way that latching lug 18 is situated on one side of rotation axis 21, and an actuating end 22 is situated on the opposite side of rotation axis 21. As illustrated in FIG. 3, it is preferably provided that rotation axis 21 is situated eccentrically with regard to the longitudinal extension of guide element 8, in the front half, i.e., closer to latching lug 18 than to actuating end 22. The function of actuating end 22 will be addressed in greater detail later on.

Figure 4:
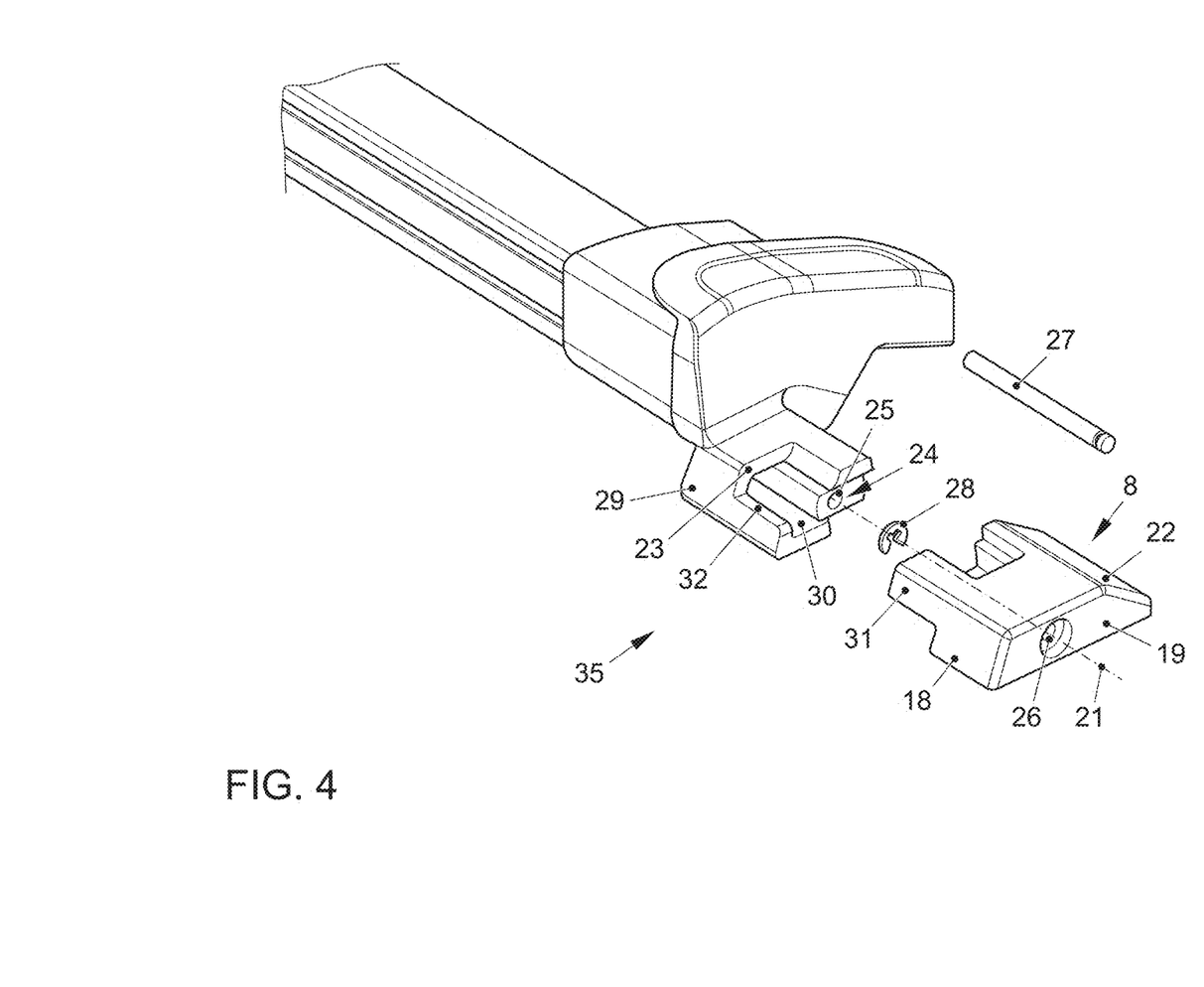
FIG. 4 shows a detailed view in an exploded view.

Guide element 8 is furthermore assigned a lever element 23, which, in the present exemplary embodiment, is fixedly connected to bearing rod 10 and forms a single piece with bearing rod 10. Lever element 23 forms a pivot joint 24 for guide element 8 for the purpose of rotating the latter around axis 21. For this purpose, lever element 23 has a cylindrical receptacle 25. A corresponding receptacle 26 is also provided in guide element 8. A bearing bolt 27 extends through both receptacles 25, 26, as illustrated in an exploded representation in FIG. 4. Bearing bolt 27 is held in the inserted position by a securing ring 28, as illustrated in FIG. 3. Guide element 8 is simultaneously held on lever element 23 thereby. Lever element 23 has a sliding tip 29, which runs flush with latching lug 18 in an initial position illustrated in FIG. 3. Lever element 23 also has a lateral recess 30, with which a lateral protrusion 31 of guide element 8 engages, as illustrated in FIGS. 3 and 4. Recess 30 and protrusion 31 are formed on the same side of rotation axis 21, namely on the side of latching lug 18 or sliding tip 29, recess 30 forming a rotary entrainment 32 for guide element 8, which limits a counterclockwise rotation of guide element 8 according to FIG. 4. Guide element 8 and lever element 23 essentially mesh with each other complementarily, guide element 8 being able to pivot or rotate around rotation axis 21 independently of lever element 23, at least over a certain angle range. Starting from the initial position according to FIG. 3, guide element 8 may rotate around rotation axis 21 in the clockwise direction at least over the certain angle range. In the initial position, when latching lug 18 and sliding tip 29 terminate flush with each other, guide element 8 and lever element 23 form a guide unit 33, which is movably supported on a sliding bearing on guide rail 4. Width b of guide rail 4 advantageously corresponds to the height of guide unit 33.

Figure 5:
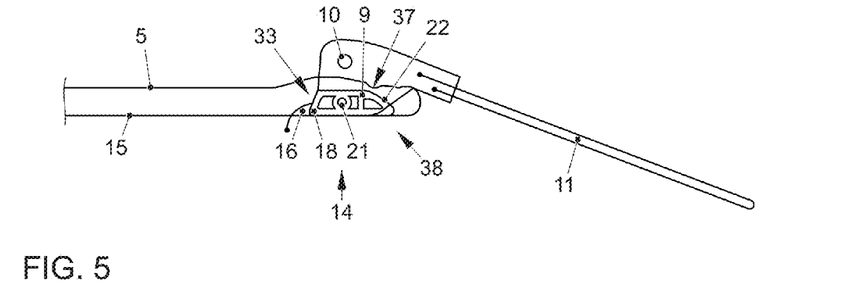
FIG. 5 shows an enlarged longitudinal sectional representation of the covering device in a use position.
Figure 6:
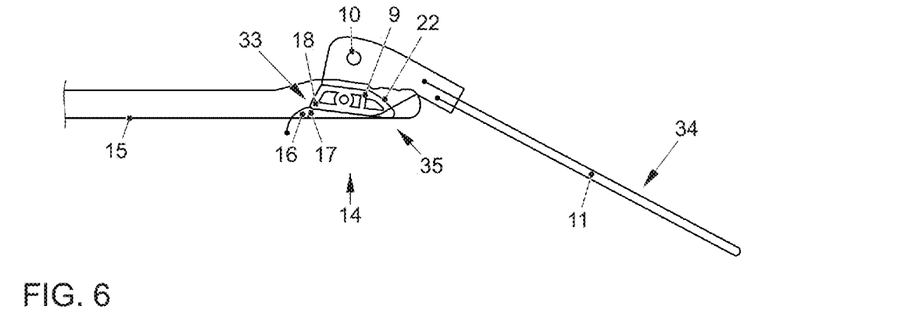
FIG. 6 shows an enlarged longitudinal sectional representation of the covering device in a first release position.

FIG. 5 shows an enlarged representation of locking device 14 from FIG. 2 in the locked position. As described above, latching lug 18 rests against latching protrusion 16, latching protrusion 16 counteracting the spring force of storage device 3. If bearing rod 10 is now tilted in a first clockwise direction with the aid of end board 11 or gripping device 12, rotary entrainment 32 pulls guide element 9, including latching lug 18, upward, as illustrated in FIG. 6. Guide elements 8, 9 are supported at their particular actuating end on particular sliding rail 15. By tilting bearing rod 10 in the clockwise direction, latching lug 18 and also sliding tip 29 of lever element 23 are thus easily lifted over latching protrusion 16, so that the spring force of storage device 3 pulls in or is able to pull in storage area cover 2 again, provided that a user manually applies a corresponding counterforce. By simply pressing down on end board 11, as indicated by an arrow 34, the lock of locking device 14 may be released.

Guide units 33 disposed on both sides of bearing rod 10 each represent one scissors-type lever 35, based on the design described above, which facilitates a release of the lock of locking device 14 even if end board 11 is translocated in the opposite direction, and bearing rod 10 is tilted accordingly in the counterclockwise direction.

Figure 7:
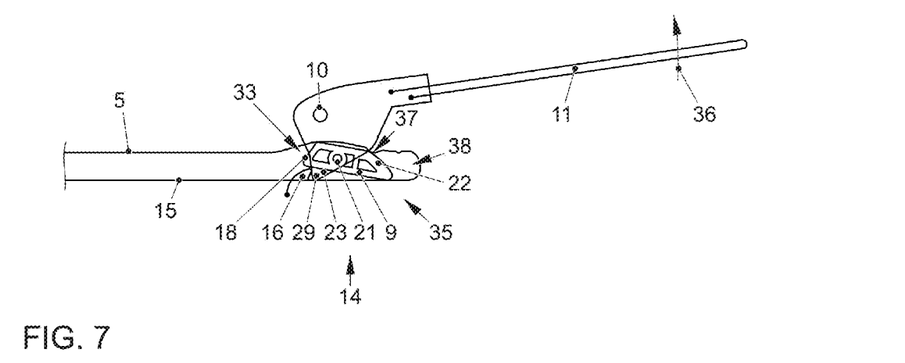
FIG. 7 shows an enlarged longitudinal sectional representation of the covering device in a second release position.

For this purpose, FIG. 7 shows a bearing rod 10, which is tilted in the counterclockwise direction and which was tilted by lifting the end board according to arrow 36. By tilting in the counterclockwise direction or by lifting end board 11, bearing rod 10 is supported on sliding rail 15 by sliding tip 29 of lever element 23, whereby rotation axis 21 is lifted upward. The leg of particular rail 4, 5 opposite sliding rail 15 has an actuating protrusion 37 assigned to actuating end 22 of particular guide element 8, 9, which prevents actuating end 22 of sliding rail 15 from being lifted when rotation axis 21 lifts up. This ensures that particular guide element 8, 9 is tilted around rotation axis 21 in the clockwise direction, whereby latching lug 18 is lifted over latching protrusion 16, as illustrated in FIG. 7. The enlarged width of guide rails 4, 5 in the area of locking device 14 permits a correspondingly wide pivoting of particular guide element 8, 9. Latching protrusion 16 is provided with a narrow design on sliding rail 15, such that it lies only in the area of guide element 8 or 9, so that lever element 23, including sliding tip 29, is able to move laterally past particular latching protrusion 16 on sliding rail 15. Thus, if latching lug 18 is lifted over latching protrusion 16 by lever device 38, comprising lever element 23 and rotatable guide elements 8, 9 of particular guide unit 33, when end board 11 is lifted upward according to arrow 36, the lock of locking device 14 is released, and guide unit 33 may be moved in guide rail 5 in the direction of storage device 3, particular guide elements 8, 9 being guided over particular latching protrusion 16 and past particular lever element 29 on particular latching protrusion 16.

Due to the advantageous design of covering device 1, a release of locking device 14 or 39 is always ensured regardless of the direction in which end board 11 moves or bearing rod 10 is tilted. This has the advantage, for example, that, if the storage area is packed so full that end board 11 is no longer able to be tilted downward in the direction of the storage area, the lock nevertheless may be released by lifting the end board.

It is, of course, also conceivable to design the width of guide rail 5 to be consistently constant, i.e., also in the area of locking devices 14 and 39. In this case, only the guiding system between locking devices 14, 39 and storage device 3 would be provided with a greater clearance, which could reduce the perceived value of covering device 1 for the user. However, covering device 1 would operated in the same manner.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A covering device for a storage area of a motor vehicle, the device comprising:
    a storage area cover that is flexible at least in sections and that is pullable out of a storage device against a spring force into a use position, the storage area cover having a longitudinally extending bearing rod on a free end, which extends over a width of the storage area cover and having a guide element on each of its free ends;
    a guide device that has two guide rails extending substantially parallel to each other, in which the guide elements are respectively guidable; and
    at least one locking device for releasably locking the guide elements in the guide rails, the locking device having a latching protrusion in at least one of the guide rails to which the guide element is latchable against the spring force via a latching lug, the latching lug being liftable over the latching protrusion for releasing the locking device by tilting the bearing rod in a first direction via an actuating element,
    wherein the guide elements, which are disposed to be tiltable relative to the bearing rod, are assigned at least one lever device that lifts the latching lug over the latching protrusion when the bearing rod is tilted in a second direction opposite the first direction.

2. The covering device according to claim 1, wherein the lever device forms a scissors-type lever with the guide element, the guide element being connected in a scissors-like manner to a lever element by a pivot joint.

3. The covering device according to claim 2, wherein the pivot joint forms a rotation axis around which the guide element and a lever element are rotatable relative to each other at least in areas, and wherein the rotation axis is oriented substantially parallel to the longitudinal extension of the bearing rod.

4. The covering device according to claim 2, wherein the lever element has a sliding tip, which is arranged at a distance from a rotation axis of the pivot joint for sliding contact with the guide rail, and which is fixedly connected to the bearing rod.

5. The covering device according to claim 2, wherein the guide rails each have a U-shaped profile and are oppositely oriented to face each other, wherein a lower leg of the guide rails form a slide rail on which the lever element rests with the sliding tip.

6. The covering device according to claim 2, wherein the latching protrusion of the locking device is arranged on the sliding rail in such a narrow manner that the lever element, including its sliding tip on the sliding rail, is adapted to slide past the latching protrusion.

7. The covering device according to claim 4, wherein the guide rails each have an actuating protrusion on a leg opposite the latching protrusion, which, in the latched position of the guide element, is assigned to an actuating end of the guide element at a distance from the rotation axis for holding the guide element on the sliding rail when the bearing rod is tilted in the second direction.

8. The covering device according to claim 2, wherein the lever element has a rotary entrainment for the guide element for releasing the latching lugs from the latching protrusions when the bearing rod is tilted in the first direction.

9. The covering device according to claim 1, wherein the bearing rod is assigned an at least essentially rigid end board as the actuating element, which is fixedly connected to the bearing rod for tilting the bearing rod.

10. The covering device according to claim 5, wherein the oppositely oriented legs of the guide rails are substantially parallel to each other and have a greater distance from each other only in an area of the locking device.

\* \* \* \* \*